United States Patent [19]

Yamada et al.

[11] Patent Number: 4,743,965
[45] Date of Patent: May 10, 1988

[54] STEREOSCOPIC TELEVISION PICTURE TRANSMISSION SYSTEM

[75] Inventors: Mitsuho Yamada; Haruo Isono; Minoru Yasuda, all of Tokyo, Japan

[73] Assignee: Nippon Hoso Kyokai, Tokyo, Japan

[21] Appl. No.: 10,195

[22] PCT Filed: May 6, 1986

[86] PCT No.: PCT/JP86/00232

§ 371 Date: Dec. 31, 1986

§ 102(e) Date: Dec. 31, 1986

[87] PCT Pub. No.: WO86/06914

PCT Pub. Date: Nov. 20, 1986

[30] Foreign Application Priority Data

May 7, 1985 [JP] Japan .................................. 60-96285

[51] Int. Cl.[4] .......................... H04N 13/00; H04N 7/12
[52] U.S. Cl. ...................................... 358/88; 358/135; 358/138; 358/3; 358/91; 358/92
[58] Field of Search ....................... 358/88, 89, 91, 92, 358/3, 105, 138, 133, 135, 136

[56] References Cited

U.S. PATENT DOCUMENTS 4,323,920 4/1982 Collender .............................. 358/88

FOREIGN PATENT DOCUMENTS 0092989 6/1982 Japan .
0086383 5/1984 Japan .................................... 358/88
0264194 12/1985 Japan .

Primary Examiner—Howard W. Britton
Assistant Examiner—Victor R. Kostak
Attorney, Agent, or Firm—Spencer & Frank

[57] ABSTRACT

A stereoscopic television picture transmission system includes a device (14) for obtaining a picture signal with respect to one of right and left pictures in a stereoscopic television, circuitry (22) for obtaining a difference signal between a right picture signal for the right picture and a left picture signal for the left picture, circuitry (27, 28, 29, 30) for effecting sub-Nyquist sampling of the difference signal at a frame period relating to a critical frequency for stereoscopic visual perception in a direction of depth to obtain a sampled difference signal, circuitry (36, 42) for combining one picture signal with the sampled difference signal to form a combined signal and for transmitting the combined signal, circuitry (50) for separating one picture signal and the difference signal from the transmitted combined signal, circuitry (56, 58, 60) for judging a motion between frames of the separated one picture signal, circuitry (62, 64) responsive to the motion judgement result for effecting interframe interpolation of the separated difference signal, and circuitry (66) for combining the separated one picture signal with the interframe interpolated difference signal to obtain the other picture signal of the right and left picture signals.

16 Claims, 17 Drawing Sheets

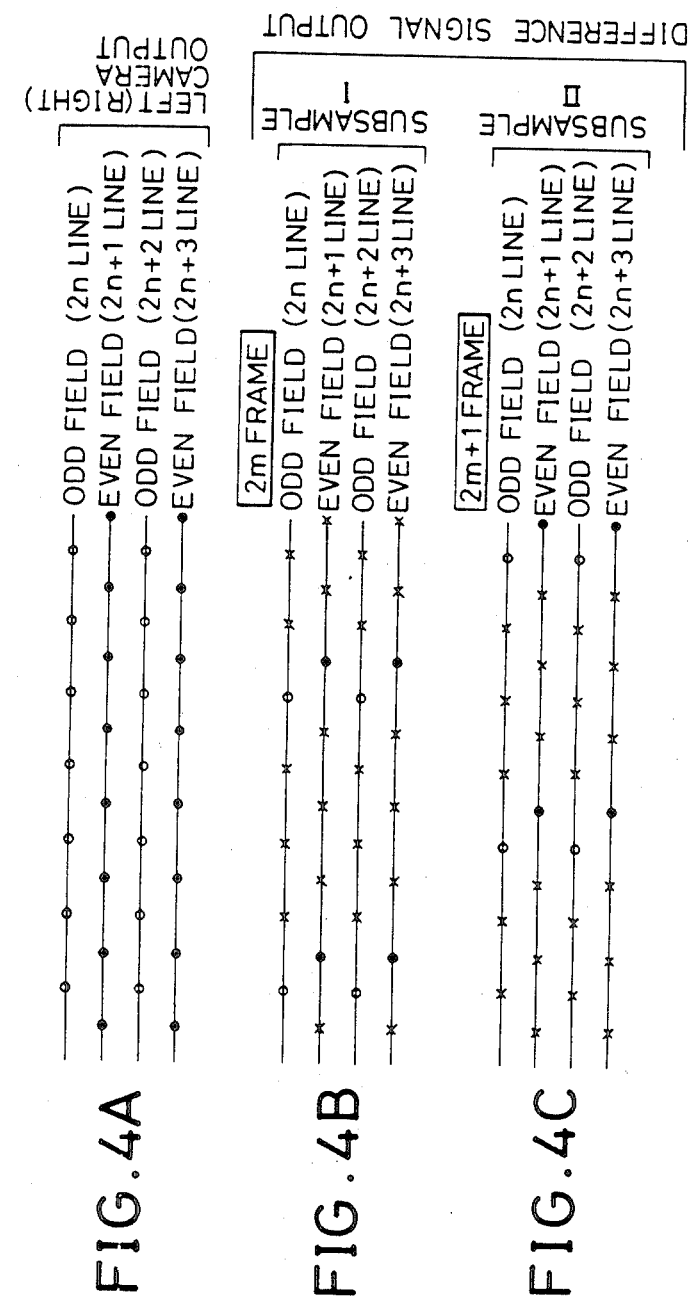

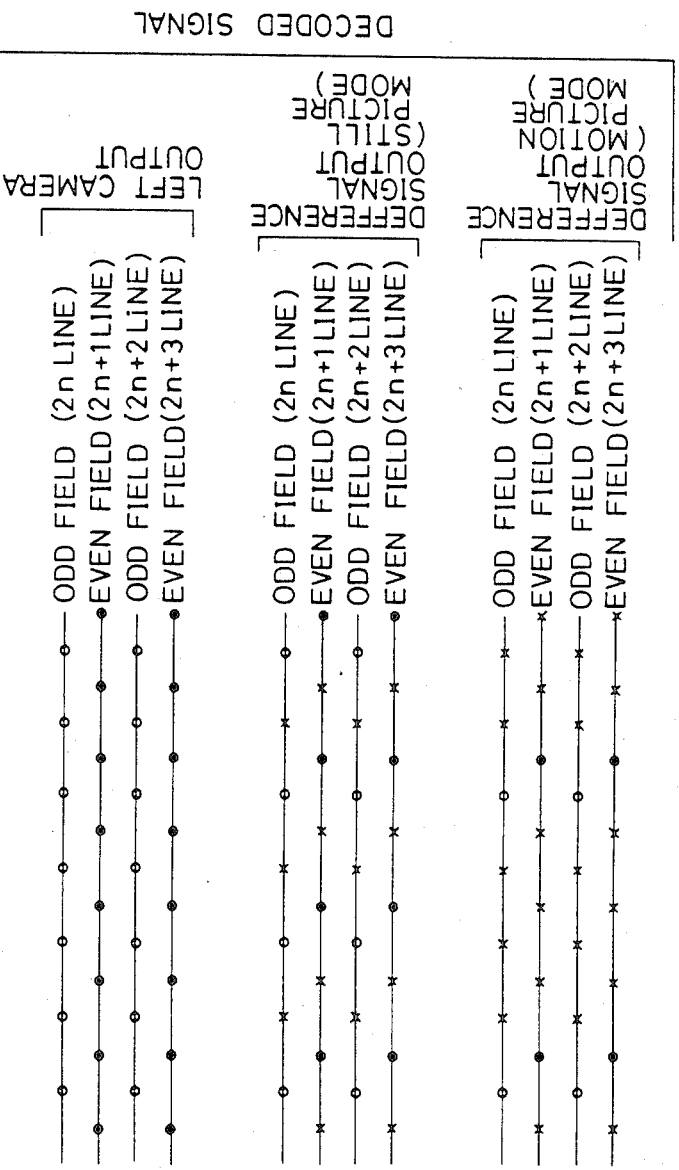

STEREOSCOPIC TELEVISION PICTURE TRANSMISSION SYSTEM

BACKGROUND OF THE INVENTION

The present invention relates to a stereoscopic television picture transmission system in which a stereoscopic television signal having compressed a frequency band is transmitted or recorded, and more particularly to a stereoscopic television picture transmission system for displaying a high definition television picture by performing subsampling with consideration being given to the time-frequency characteristic of the visual parallax sensed by a human being in the depth direction of a picture.

When an image having a three dimensional appearance is reproduced, two television signals corresponding to the fields of view of by the left and right eyes of a human being are required.

So far, in order to reproduce a three-dimensional image, it has been necessary to simultaneously transmit two video signals and to perform synchronous recording and reproduction by using two VTRs. However, the prior art system described above has a problem in terms of increased cost, since the transmission lines must be doubled and two VTRs must be additionally there are various disadvantages such as providing precision circuits and devising a transmission system for representing subtle parallax.

Therefore, in order to compress two stereoscopic television signals, corresponding to the right and left eyes, into a frequency band of the conventional one channel television signal for transmission there is proposed a system in which a difference signal that is, a parallax signal with respect to the right and left picture signals-is compressed for transmission by utilizing the degree of correlation between the right and left pictures. That is, parallax between the right and left pictures exists only in a near-distance view (for instance, an object within 10 meters from the cameras) and does not exist in the case of a long-distance view, so that the difference signal is produced only when parallax exists. Therefore, it is considered to compress and transmit the difference signal by effecting a time-axis compression of a time interval in which no parallax exists.

However, the difference signal originally includes many high frequency components of 1-2 MHz so that when the difference signal is compressed in the manner described above, the limitation of the differential signal band adversely affects the generation of a quality stereoscopic picture.

SUMMARY OF THE INVENTION

In view of the above, one of the objects of the present invention is to provide a stereoscopic television picture transmission system which substantially eliminates the causes for degrading the quality of pictures, and which compresses the stereoscopic picture signals into a conventional one channel television signal band, so that a high quality stereoscopic picture can be transmitted.

Another object of the present invention is to provide a stereoscopic television picture transmission system for stereoscopic pictures, in which a picture which moves in the direction of depth (referred to as "a moving picture") and a picture which does not move in the direction of the depth (and which is referred to as "a still picture" including a picture which does not move in the direction of the depth even if it moves two-dimensionally) are subjected to different processings from the standpoint of visual characteristics so as to compress the frequency band occupied by the moving pictures. It then becomes possible to transmit a higher frequency component of the difference signal, whose transmission is difficult when the difference signal is merely compressed, and therefore a high definition stereoscopic picture can be displayed.

To this end, the present invention, utilizes the fact that the time-frequency the parallax in characteristics of visual perception of depth deteriorates considerably as compared with a still picture when the frequency is increased that is, in case of a moving picture so that depth perception by parallax is almost eliminated. That is, from the standpoint of visual perception, no problem arises even when the resolution in the direction of depth of the moving picture in the difference signal is reduced to $\frac{1}{2}$-1/6 of the resolution in the direction of depth of the still picture. With this in view, the difference signal for the moving picture is considerably compressed, while the difference signal for the still picture is less compressed, so that it becomes possible to transmit the higher frequency component of the difference signal, which has hitherto been difficult when the difference signal is merely compressed.

In order to achieve the above objects, a stereoscopic television picture transmission system according to the present invention is characterized by comprising:

means for obtaining a picture signal with respect to one of right and left pictures in stereoscopic television;

means for obtaining a difference signal between a right picture signal for the right picture and a left picture signal for the left picture;

means for effecting sub-Nyqyist sampling of the difference signal at a frame period relating to a critical frequency for stereoscopic visual perception in a direction of depth to obtain a sampled difference signal;

means for combining the one picture signal with the sampled difference signal to form a combined signal and for transmitting the combined signal;

means for separating one picture signal and a difference signal from the combined signal thus transmitted;

means for judging a motion between frames of the one picture signal thus separated;

means responsive to a result of judgement of a motion by the judging means for effecting interframe interpolation of a difference signal thus separated; and means for combining the separated one picture signal with the interframe interpolated difference signal, to obtain the other picture signal of the right and left picture signals.

Here, in case of a still picture which does not move in the depth direction, picture elements of at least a picture longer than one frame may be interpolated sequentially by a difference signal between adjacent frames of a plurality of successive frames.

When the separated one picture signal has a motion in excess of a predetermined threshold value in the depth direction of the picture, at least the separated difference signal may be subject to interfield interpolation.

When the frame period is longer than a predetermined value, the separated difference signal may be subject to interfield interpolation.

Here, both of the difference signal and the one picture signal may be time-axis compressed and time-axis multiplexed to be transmitted.

A stereoscopic television picture transmission apparatus according to the present invention is characterized by comprising:

means for deriving a picture signal of one of right and left pictures in stereoscopic television;

means for limiting a frequency band of the one picture signal;

means for effecting time-axis compression of one picture signal whose frequency band is limited;

means for obtaining a difference signal between a right picture signal for the right picture and a left picture signal for the left picture;

means for limiting a frequency band of the difference signal;

means for effecting sub-Nyquist sampling of the difference signal having a limited frequency band at a frame period relating to a critical frequency for stereoscopic visual perception in a direction of depth to obtain a sampled difference signal;

means for effecting time-axis compression of the sampled difference signal; and means for combining one thus time-axis compressed picture signal with a difference signal thus time-axis compressed.

In a stereoscopic television picture transmission system in which a picture signal with respect to one of right and left pictures in stereoscopic television is derived, a difference signal between a right picture signal for the right picture and a left picture signal for the left picture is obtained and is subject to sub-Nyquist sampling at a frame period relating to a critical frequency for the visual perception in a direction of depth to obtain a sampled difference signal, and the one picture signal and the sampled difference signal are time-axis compressed and combined to be transmitted, a stereoscopic television picture receiving apparatus according to the present invention is characterized by comprising:

means for separating one picture signal and a difference signal from the combined signal thus transmitted;

means for effecting time-axis expansion of one picture signal thus separated;

means for effecting time-axis expansion of a difference signal thus separated;

means for judging a motion between frames of the one picture signal thus time-axis expanded;

means responsive to a result of judgement of a motion by the judging means for effecting interframe interpolation of the difference signal thus time-axis expanded; and means for combining the time-axis expanded one picture signal with the interframe interpolated difference signal to obtain the other picture signal of the right and left picture.

Here, in case of a still picture which does not move in the depth direction, picture elements at least of a picture longer than one frame may be sequentially interpolated by a difference signal between adjacent frames of a plurality of succeeding frames.

When the separated one picture signal has a motion in excess of a predetermined threshold value in the depth direction of the picture, at least the separated difference signal may be subject to the interfield interpolation.

When the frame period is longer than a predetermined value, the separated difference signal may be subject to interfield interpolation.

In another aspect of the present invention, a stereoscopic television picture transmission system is characterized by comprising:

means for obtaining a picture signal with respect to one of right and left pictures in stereoscopic television;

means for obtaining a difference signal between a right picture signal for the right picture and a left picture signal for the left picture;

means for dividing and assigning the difference signal into the number of frames corresponding to a frame period relating to a critical frequency for stereoscopic visual perception in a direction of depth to obtain a divided difference signal;

means for effecting sub-Nyquist sampling of the divided difference signals at the frame period;

means for combining the one picture signal with the sampled difference signal to form a combined signal and for transmitting the combined signal;

means for separating one picture signal and a difference signal from the combined signal thus transmitted;

means for effecting interframe interpolation of a difference signal thus separated at the frame period; and means for combining the separated one picture signal with the interpolated difference signal to obtain the other picture signal of the right and left picture signals.

Here, when the frame period is longer than a predetermined value, the interframe interpolation of separated difference signal may be carried out.

A motion in a predetermined number of fields in the separated difference signal may be judged in such a way that when a motion judgement result indicates a still picture, the separated difference picture is derived as it is, and when the motion judgement result indicates a motion picture, the separated difference signal is derived every time of the predetermined number of fields.

BRIEF DESCRIPTION OF THE DRAWINGS

FIGS. 4A–4F are diagrams used to explain sampling of and picture reconstruction of a stereoscopic picture;

DESCRIPTION OF THE PREFERRED EMBODIMENTS

Referring now to the accompanying drawings, the present invention will be described in detail.

Figure 1:
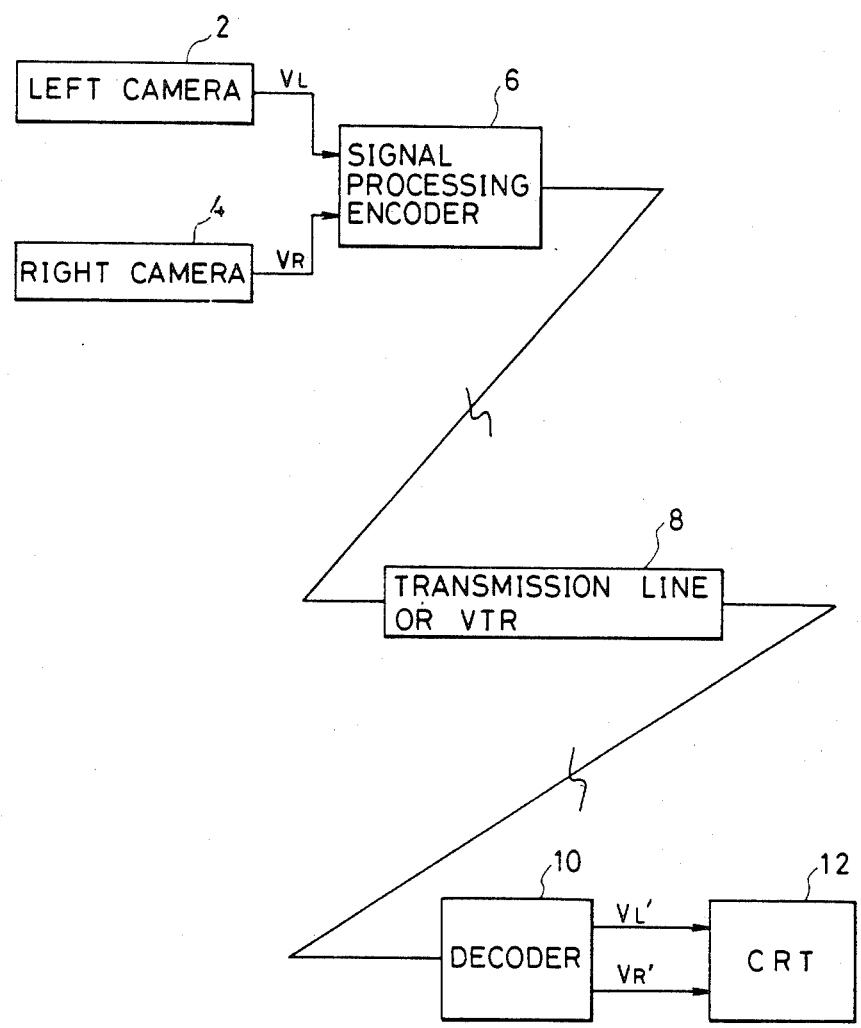
FIG. 1 is a block diagram schematically the construction of a stereoscopic television system to which the present invention is applied.

FIG. 1 shows schematically an outline the construction of a stereoscopic television system to which the present invention is applied. Output signals $V_L$ and $V_R$ corresponding to the images perceived by the left and right eyes are derived from a left camera 2 and a right camera 4. The output signals are combined by a signal processing encoder 6 so that the combined signal is delivered to a transmission line or a VTR 8. On the receiver side, a decoder 10 decodes the signal transmitted through the transmission line or from the VTR 8 to separate the output signal $V'_L$ from the output signal $V'_R$ so that a three dimensional picture is displayed on a CRT 12.

Figure 2:
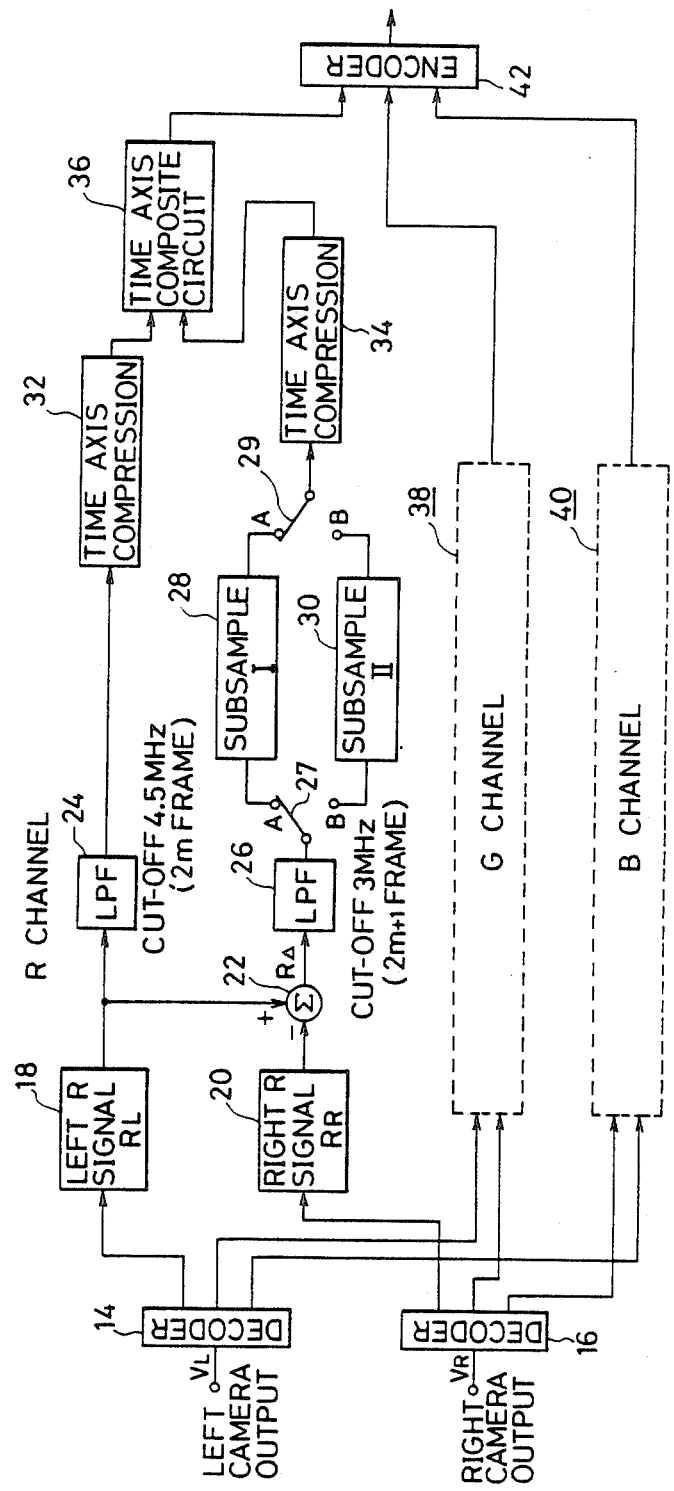
FIG. 2 is a block diagram showing an embodiment of the whole construction of the signal processing encoder shown in FIG. 1.

FIG. 2 is a detailed block diagram showing an embodiment of the signal processing encoder 6.

In general, the following picture signal utilization processes are known:

(1) the process in which the composite signal itself is used;

(2) the process in which the luminance signal and the color signals (Y, I and Q) are used; and (3) the process in which the picture signal is separated into the most fundamental red, green and blue signals R, G and B.

In the first embodiment of the present invention, a signal processing circuit using the R, G and B signals is employed, but it is to be understood that the present invention is not limited to the above-described circuit and that it may be equally applied to any of the processing methods (1)-(3) described above.

Referring to FIG. 2, reference numeral 14 denotes a decoder which receives the left camera output signal $V_L$ to decode the red, green and blue signals $R_L$, $G_L$ and $B_L$ 16 is a decoder which receives the right camera output signal $V_R$ to decode the red, green and blue signals $R_R$, $G_R$ and $B_R$; denotes a buffer amplifier for amplifying the red signal $R_L$ from the left camera; denotes a buffer amplifier for amplifying the red signal $R_R$ from the right camera; 22 denotes a subtraction circuit for obtaining the difference signal $R_\Delta = R_L - R_R$; 24 denotes a low-pass filter with a cut-off frequency of 4.5 MHz which receives the output from the buffer amplifier 18 to limit the frequency band of the signal representative of the left picture to 4.5 MHz; and 26 is a low-pass filter with a cut-off frequency of 3.0 MHz which receives the output signal from the subtraction circuit 22 to limit the frequency band of the difference signal to 3.0 MHz.

Reference numerals 28 and 30 denote sampling circuits for subsampling the output signal from the low-pass filter 26 in a manner which will be described in detail hereinafter with reference to FIGS. 4B and 4C. The input to the sampling circuits 28 and 30 and the output derived from the sampling circuits 28 and 30 are switched at every frame by analog switches 27 and 29, which are actuated in synchronism with each other so that the sampling circuit 28 subsamples the even-numbered frames (that is, the $2m^{th}$ frames), while the sampling circuit 30 subsamples the odd-numbered frames (that is, the $(2m+1)^{th}$ frames).

Reference numerals 32 and 34 denote time-axis compression circuits for performing the time-axis compression of the outputs from the filter 24 and the switch 29, respectively, at different time-axis compression ratios. Reference numeral 36 is a time-axis composition circuit for combining the output from the compression circuits 32 and 34 in the direction of the time axis.

Reference numeral 38 denotes a processing circuit for the G signal and reference numeral 40 denotes a processing circuit for the B signal, both of which are arranged substantially similar to the circuits 18–36 for processing the R signal. The reason why only the R channel is shown in FIG. 2 is that the substantially similar processing circuits may be used for the G and B channels.

Reference numeral 42 denotes an encoder for encoding the outputs from the time-axis composition circuits 37 for the R, G and B channels to form a stereoscopic picture signal.

The stereoscopic picture signal in the first embodiment use the output signal (identified by "L") from the left camera as a reference signal. The frequency bands of the output signals from the left and right cameras and the frequency band of the output signal from the encoder 42 are all 6 MHz.

In the first embodiment, in order to perform the time-axis compression which will be described in detail hereinafter with reference to FIG. 3, the difference signal $R_\Delta = R_L - R_R$ and the red signal $R_L$ from the left camera are applied to the low-pass filters 26 and 24, respectively, so as to limit the frequency bands. That is, the output $V_L$ from the left camera is cut off at 4.5 MHz and the difference signal $R_\Delta$ is cut off at 3 MHz.

Figure 3:
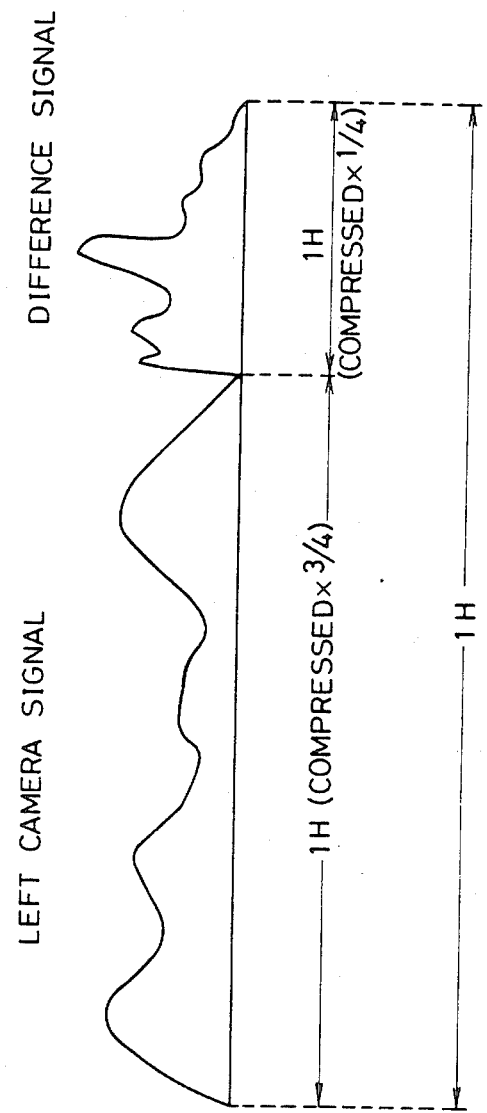
FIG. 3 shows a signal waveform illustrating an example of the form of a compressed signal for one scanning line.

Next, the left camera output derived from the low pass filter 24 is applied to the time-axis compression circuit 32 to accomplish time-axis compression by $\frac{3}{4}$ as shown in FIG. 3.

On the other hand, the difference signal must be subjected to time-axis compression by $\frac{1}{4}$. Therefore, the frequency band becomes 3 MHz$\times(4/1)=12$ MHz, which is twice as high as 6 MHz. Therefore, "subsampling" in which the sampling points are switched at every frame will be carried out.

Referring now to FIGS. 4A through 4C, the subsampling method will be described in detail hereinafter. As is clear from the provision of the low-pass filter 26 as shown in FIG. 2, the frequency band to be occupied by the difference signal is limited to $\frac{1}{2}$ with respect to the left camera output as shown in FIG. 4A, so that the sampling number of the difference signal which has passed through the low-pass filter 26 becomes one half.

Sub-Nyquist sampling in which the difference signal from the low-pass filter 26 is alternately applied through the switch 27 to the subsampling circuits 28 and 30 for each frame and then one difference signal is subtracted so that the subsampling outputs are derived for even-numbered and odd-numbered frames, respectively, as shown in FIGS. 4B and 4C. Sample information obtained by subtracting ¼ sampling points from all of the sampling points is derived by the switch 29.

The difference signal at every frame obtained by the subsampling in the manner described above is applied to the time-axis compression circuit 34 so that the difference signal is time-axis compressed to form a signal whose frequency band is 6 MHz. The signal thus obtained and the time-axis compressed output with respect to the left camera are combined in the time-axis direction, so that the combined signal as shown in FIG. 3 is obtained.

In like manner, time-axis combined signals are obtained for both the G and B channels. These signals are applied to the encoder 42 and then converted into coded signals which in turn are transmitted through the transmission line or are recorded by a VTR.

Figure 5:
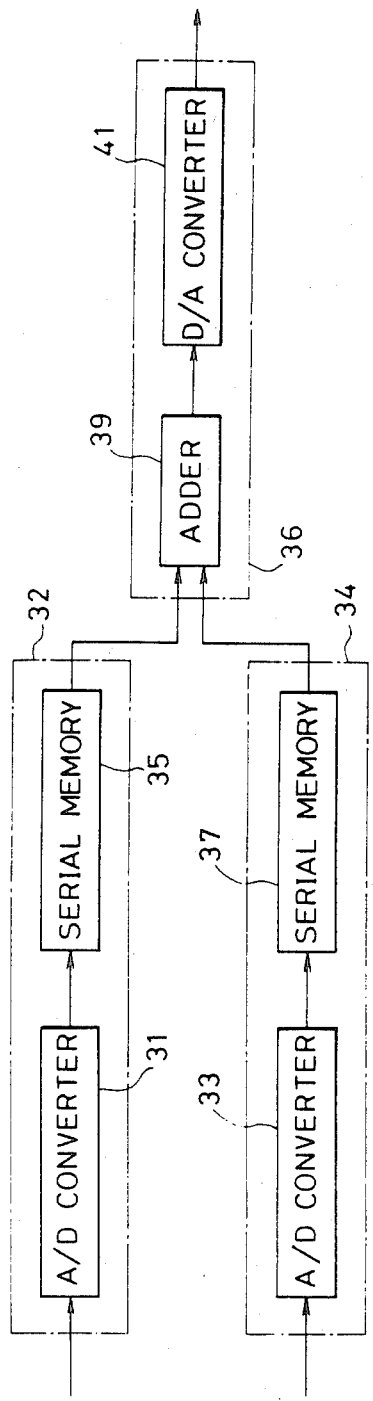
FIG. 5 is a block diagram showing an embodiment of the time-axis compression circuit and the time-axis synthesizing circuit shown in FIG. 2.
Figure 6:
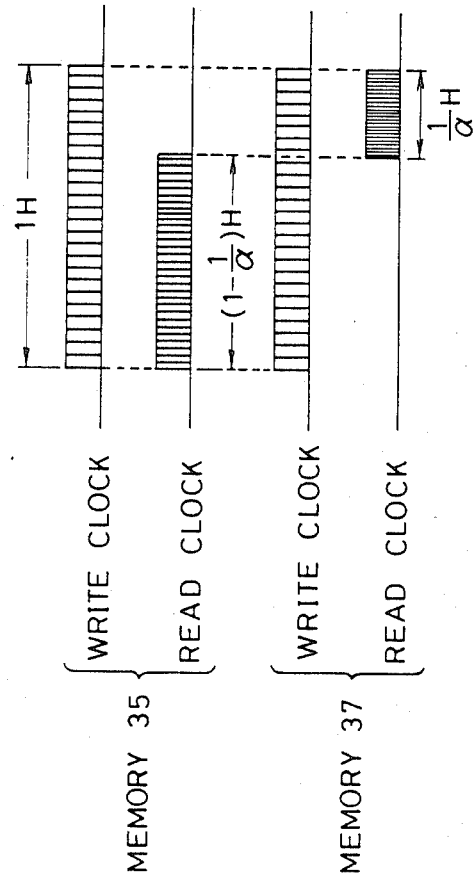
FIG. 6 illustrates waveforms used to explain the mode of operation thereof.

Each of the subsampling circuits 28 and 30 described above may be a circuit, for instance, CX20096 manufactured by Sony, which performs sample holding at the timing of a sample hold pulse generated in response to the frame pulse. The time-axis compression circuit 32 and the time-axis composition circuit 36 may be arranged as shown in FIG. 5, for instance. That is, the time-axis compression circuits 32 and 34 for the left camera signal delivered from the low-pass filter 24 comprise A/D converters 31 and 33, and serial memories 35 and 37 for storing therein the digital output derived from the A/D converters 31 and 33, respectively. In the serial memories 35 and 37, when the digital signals derived from the A/D converters 32 and 33 are stored in response to a write-in clock of f[Hz], read-out clocks are determined to be $f \times \alpha/(\alpha-1)$[Hz] and $f \times \alpha$[Hz], so that the stored signals are compressed by $[1-(1/\alpha)] \times H$ and $(1/\alpha) \times H$ and then read out, respectively, as shown in FIG. 6.

The time-axis composition circuit 36 comprises a digital adder 39 and a D/A converter 41. The output signals derived from the memories 35 and 37 are added to each other in the digital adder 39. The output from the digital adder 39 is in turn converted into an analog output by the D/A converter 41 (for instance, CX20051A manufactured by Sony) to obtain a time-axis composite output.

Next, a decoder for decoding the stereoscopic picture signal thus obtained will be described hereinafter.

Figure 7:
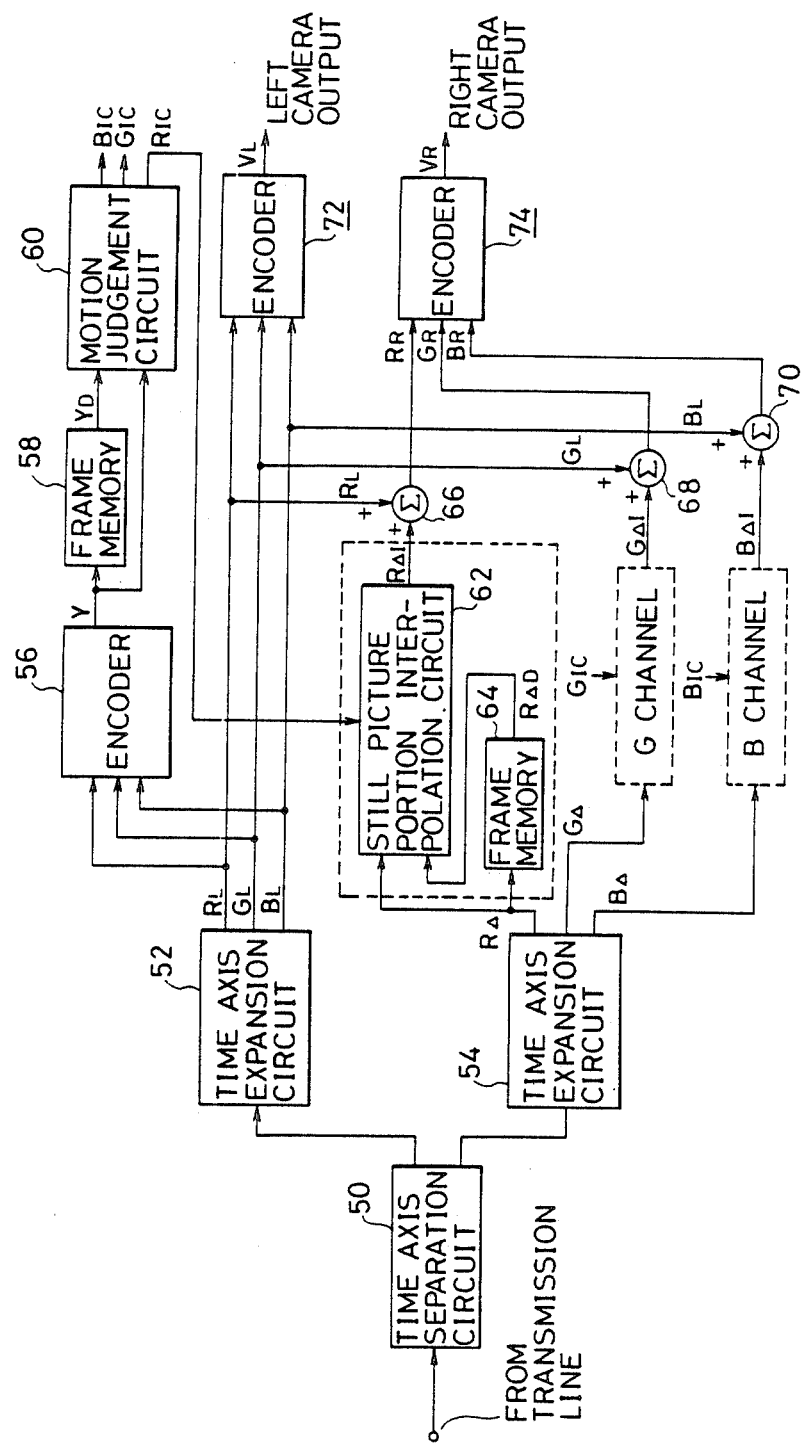
FIG. 7 is a block diagram showing an embodiment of the whole decoder shown in FIG. 1.

FIG. 7 is a block diagram showing an embodiment of the whole arrangement of the decoder. Reference numeral 50 designates a time-axis separation circuit which receives the stereoscopic picture signal from the transmission line or the VTR to deliver a reproduced left camera signal and a difference signal in the manner described above with reference to FIG. 3. Reference numerals 52 and 54 are time-axis expansion circuits which receive the reproduced left camera signal and the reproduced difference signal to expand the signals in the time-axis direction so as to derive expanded signals $R_L$, $G_L$ and $B_L$ and $R_\Delta$, $G_\Delta$ and $B_\Delta$, each having a time interval equal to 1H. Reference numeral 56 denotes an encoder which receives the left camera signals $R_L$, $G_L$ and $B_L$ from the time-axis expansion circuit 52 to generate a luminance signal Y, and 58 denotes a frame memory for storing therein the luminance signal Y for a time period of one frame. Reference numeral 60 denotes a motion judgement circuit which receives the luminance signal $Y_D$ delayed by one frame and derived from the frame memory 58 and the present luminance signal Y to detect motion between the frames so as to form interpolation control pulses $R_{IC}$, $G_{IC}$ and $B_{IC}$.

Reference numeral 62 designates a circuit which receives the difference signal $R_\Delta$ from the time-axis expansion circuit 54 and a signal $R_{\Delta D}$, which is derived from a frame memory 64. Frame memory 64 delays the difference signal $R_\Delta$ by one frame. Circuit 62 responds to an interpolation control signal $R_{IC}$ derived from the motion judgement circuit 60 and forms a difference signal $R_{\Delta I}$ in which the picture elements in the still region are interpolated. (The present embodiment is described only in conjunction with the R channel, but the circuits for the G and B channels are substantially similar in construction to the circuit for the R channel). Reference numerals 66, 68 and 70 designate adders for adding the interpolated difference signals $R_{\Delta I}$, $G_{\Delta I}$ and $B_{\Delta I}$ from the respective R, G and B channels to the signals $R_L$, $G_L$ and $B_L$ from the time-axis expansion circuit 52 to form right camera signals $R_R$, $G_R$ and $B_R$. Reference numerals 72 and 74 denote encoders for combining the left camera signals $R_L$, $G_L$ and $B_L$ with the right camera signals frame memory 64, which delays the difference signal be one frame) outputs $V_L$ and $V_R$, respectively.

In FIG. 7, while only the processing of the difference signal in the R channel is shown, arrangements for processing the difference signals in the G and B channels are substantially similar in construction to the processing circuit for the R channel.

Next, the mode of operation of the decoder shown in FIG. 7 will be described.

The transmitted stereoscopic picture signal is separated into the left camera signal and the difference signal by the time-axis separation circuit 50. the respective output signals from the circuit 50 are applied to the time-axis expansion circuits 52 and 54, in which the time-axis expansion of the signals in the respective R, G and B channels are carried out, so that the left camera signal $R_L$, $G_L$ and $B_L$ and the difference signals $R_\Delta$, $G_\Delta$ and $B_\Delta$ are reproduced.

The difference signals $R_\Delta$, $G_\Delta$ and $B_\Delta$ have been subjected to the sub-Nyquist sampling on the encoder side as described above, so that in the still picture portion interpolation circuit 62, the difference signal $R_\Delta$ is interpolated with the preceding frame signal (obtained by delaying the difference signal by one frame by the frame memory 64 to reproduce again the signal of 3 MHz. That is to say, the sample output shown in FIG. 4B and the sample output shown in FIG. 4C are interpolated with each other as shown in FIG. 4E to obtain the interpolation outputs $R_{\Delta I}$, $G_{\Delta I}$ and $B_{\Delta I}$.

On the other hand, the moving picture portion is not interpolated with the preceding frame, and the present difference signal itself is delivered as shown in FIG. 4F. Therefore, in this case the frequency band occupied by the difference signal remains unchanged and is 1.5 MHz.

Figure 8:
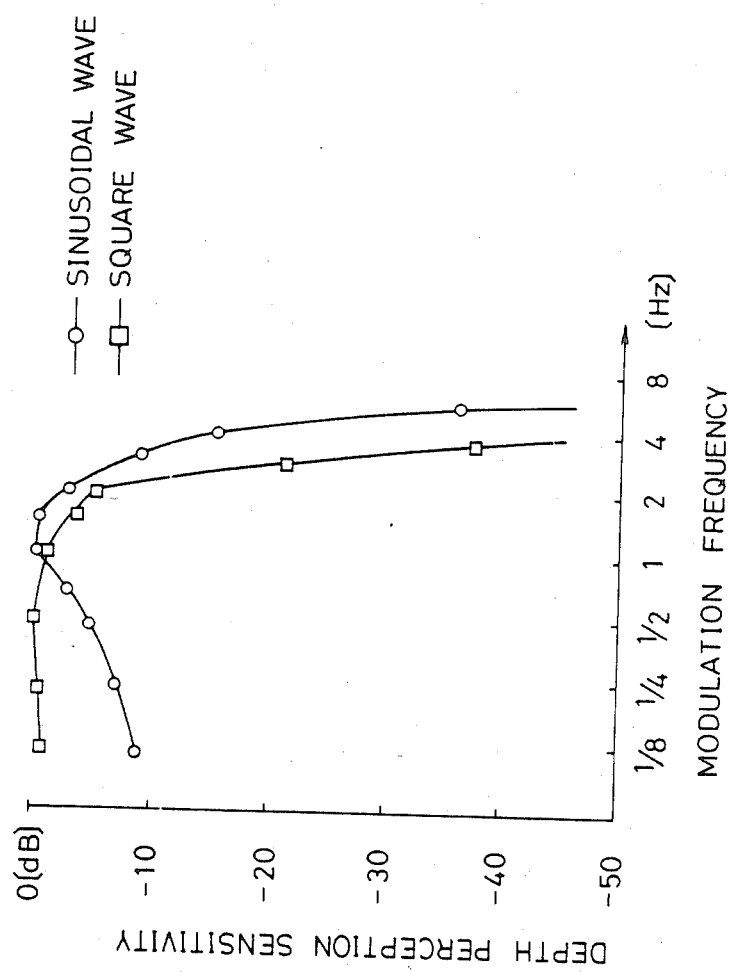
FIG. 8 illustrates time-frequency characteristic curves for parallax.

As a result, the frequency band of the component in the direction of the depth of a moving picture becomes ½ as compared with the still picture portion, but any visual perception problem will not occur as is clear from the parallax time frequency characteristic shown in FIG. 8.

FIG. 8 illustrates how the depth perception sensitivity drops when a picture exhibiting a wave-like sense of depth is displayed by a random dot stereo pattern, and the amplitude of the wave (that is, the amplitude of the wave in the depth direction) is varied by a frequency, plotted along the abscissa.

Here, the random dot stereo pattern will be explained. In general, when a random dot having a parallax is observed by the respective eyes, a part of the random dots seems in relief or depressed so that the viewed image has a three-dimensional appearance. In this case, the amount of parallax is modulated by a low frequency to produce a motion picture of concave and convex movement in the depth direction, and the depth perception sensitivity is measured.

As is apparent from FIG. 8, when the displayed picture is varied in the form of a rectangular waveform; that is, the displayed picture is varied stepwise, the depth perception sensitivity drops by more than 30 dB at a frequency of about 3 Hz. Even when the displayed picture is smoothly varied in the form of a sinusoidal waveform, the depth perception sensitivity drops by more than 30 dB at a frequency of about 5 Hz.

That is, when an object moves at a velocity higher than such frequency, depth perception sensitivity due to parallax does not exist. It follows, therefore, that when the above-described sub-Nyquist sampling is performed so that the resolution of the depth component of a motion picture is decreased as compared with a still picture in accordance with the present invention, an effective band compression can be attained.

Next, a method for detecting the motion between the frames by the motion judgement circuit 60 will be described.

In order to detect a motion, the signals $R_L$, $G_L$ and $B_L$ delivered from the time-axis expansion circuit 52 are applied to the encoder 56 to form the luminance signal Y, which in turn is stored in the frame memory 58. The motion judgement circuit 60 obtains the difference between the present luminance signal Y delivered from the encoder 56 and the delayed luminance signal $Y_D$ in the preceding frame delivered from the frame memory 58. The motion of the picture is judged by detecting whether or not the difference between the luminance signals thus obtained exceeds a predetermined threshold value.

When the motion is detected only from the left pictures as described above, not only three dimensional motion but also two-dimensional motion (a motion picture at a long distance, for instance, an airplane flying in the sky, which provides no parallax) can be detected. In this case, a parallax signal does not exist at all, so that the right and left pictures are the same and consequently the difference signal is zero (that is, $R_\Delta=0$, $R_{\Delta D}=0$). As a result, no problem arises regardless of the interpolation according to the result of the motion judgement.

When the difference signals $R_{\Delta I}$, $G_{\Delta I}$ and $B_{\Delta I}$ thus interpolated and the left camera signals $R_L$, $G_L$ and $B_L$ are added to each other by the adders 66, 68 and 70, the right camera signal $V_R$ is obtained.

So far, it has been described that out of two picture elements, only one picture element is sampled (that is, the subsampling in case of one set consisting of four fields), but as shown in FIG. 8, the time resolution of a picture moving in the depth direction may be further lowered. In practice, it is sufficient to perform subsampling for one set consisting of 8 fields or 12 fields. Specifications for these cases will be shown in the following Table.

| SYSTEM | | One Set consisting of 4 fields | One set consisting of 8 fields | One set consisting of 12 fields |
|---|---|---|---|---|
| Transmission bands | Left (right) camera output difference signal | 4.5 MHz | 5.25 MHz | 5.5 MHz |
| | still picture region | 3 MHz | 3 MHz | 3 MHz |
| | motion picture region | 1.5 MHz | 0.75 MHz | 0.5 MHz |
| Bit assignment in frame memory in decoder | frame memory 58 for detection of motion: 5 bits | 1 memory | 2 memories | 3 memories |
| | frame memory 64 for difference signal 6 bits | 1 memory | 2 memories | 3 memories |

In case of one set consisting of 8 fields, a ⅞ time-axis compression of the left pictures is carried out and a ⅛ time-axis compression of the difference signal is carried out, and the time-axis composition is performed for a time interval 1H. In case of a set consisting of 12 fields, the left picture is subjected to a 11/12 time-axis compression, the difference signal is subjected to a 1/12 time-axis compression, and the time-axis composition is performed for a time interval 1H. In case of subsampling one set consisting of 12 fields, the frequency band required for the difference signal is only 0.5 MHz. In this case, it seems at a glance that the memory capacity is increased, but since the subsampling is performed, the whole memory capacity remains unchanged. It is important to say that, for instance, in case of subsampling of one set consisting of two fields, four frame memories must be provided and of the four frame memories, three memories are used for storing the $R_\Delta$, $G_\Delta$ and $B_\Delta$ signals so that each frame memory needs to have 5 bits at the most. That is, the difference between the left and right pictures is caused only by the parallax and the correlation between both picture elements is high, so that it may be considered as a kind of a one-dimentional DPCM system. In this case, five bits suffices to provide a high quality picture which can satisfy even an expert in the art.

The remaining memory is used to detect motion and needs to have the capacity of a order of five bits.

Figure 9:
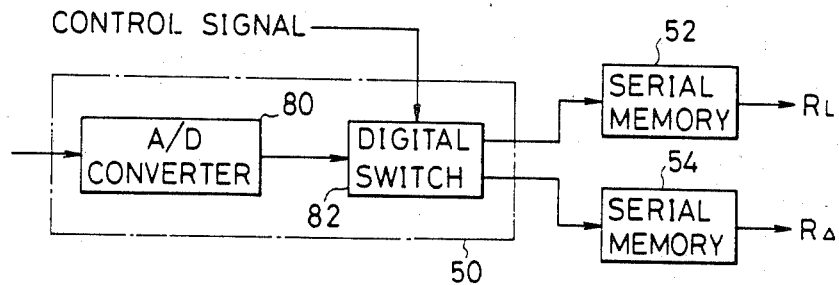
FIG. 9 is a block diagram showing an embodiment of the time-axis separation circuit and the time-axis expansion circuit shown in FIG. 7.
Figure 10:
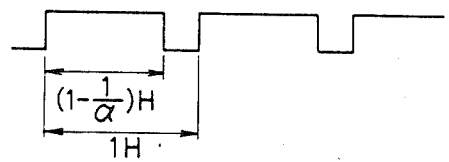
FIG. 10 and FIG. 11 illustrate signal waveforms used to explain the modes of operation thereof.
Figure 11:
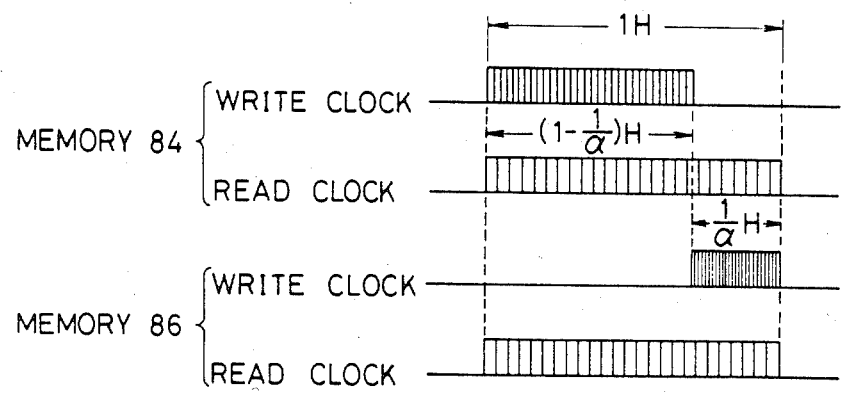

FIG. 9 is a block diagram showing detailed embodiments of the time-axis separation circuit 50 and the time-axis expansion circuits 52 and 54. The time-axis separation circuit 50 comprises an A/D converter 80 and a digital switch 82. The stereoscopic picture signal received through the transmission line is converted by the A/D converter 80 into a digital signal which in turn is switched by the digital switch 82 at a timing of a control signal shown in FIG. 10, so that the left camera signal and the difference signal are separated from each other. The left camera signal and the difference signal thus obtained are applied to the time-axis expansion circuits 52 and 54, respectively, which are formed by serial memories. The left camera signal and difference signal are written in the memories at timings provided by a write clock having a frequency of $f x \alpha/(\alpha-1)$[Hz] and a write clock having a frequency of $f x \alpha$[Hz] as shown in FIG. 11. The data stored in the serial memories 52 and 54 are read out at the same frequency f[Hz], so that the left camera signal $R_L$ and the difference signal $R_\Delta$ which are expanded in the direction of the time axis are obtained. In FIG. 9, while only the R channel is shown, the remaining G and B channels have similar arrangements.

Figure 12:
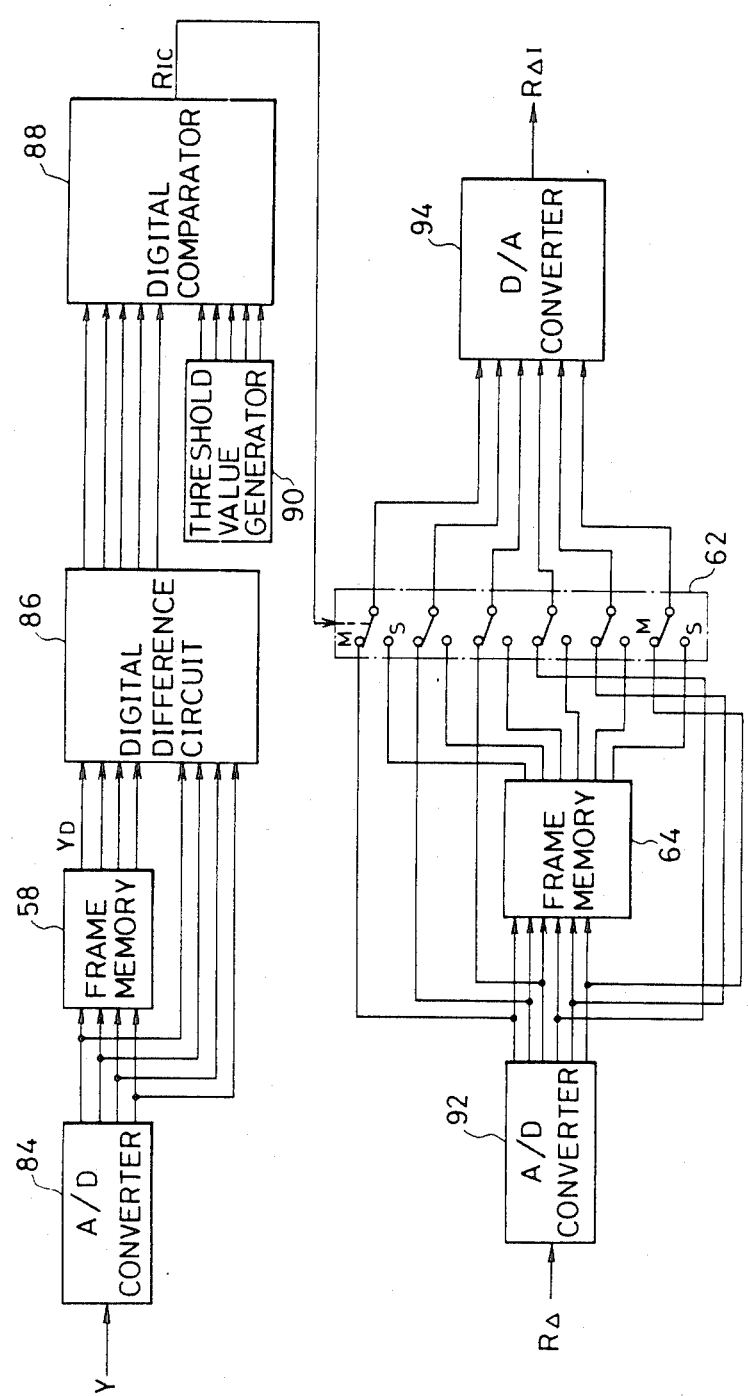
FIG. 12 is a block diagram showing one embodiment of the motion decision circuit and the circuit for interpolating picture elements in a still region shown in FIG. 7.
Figure 13:
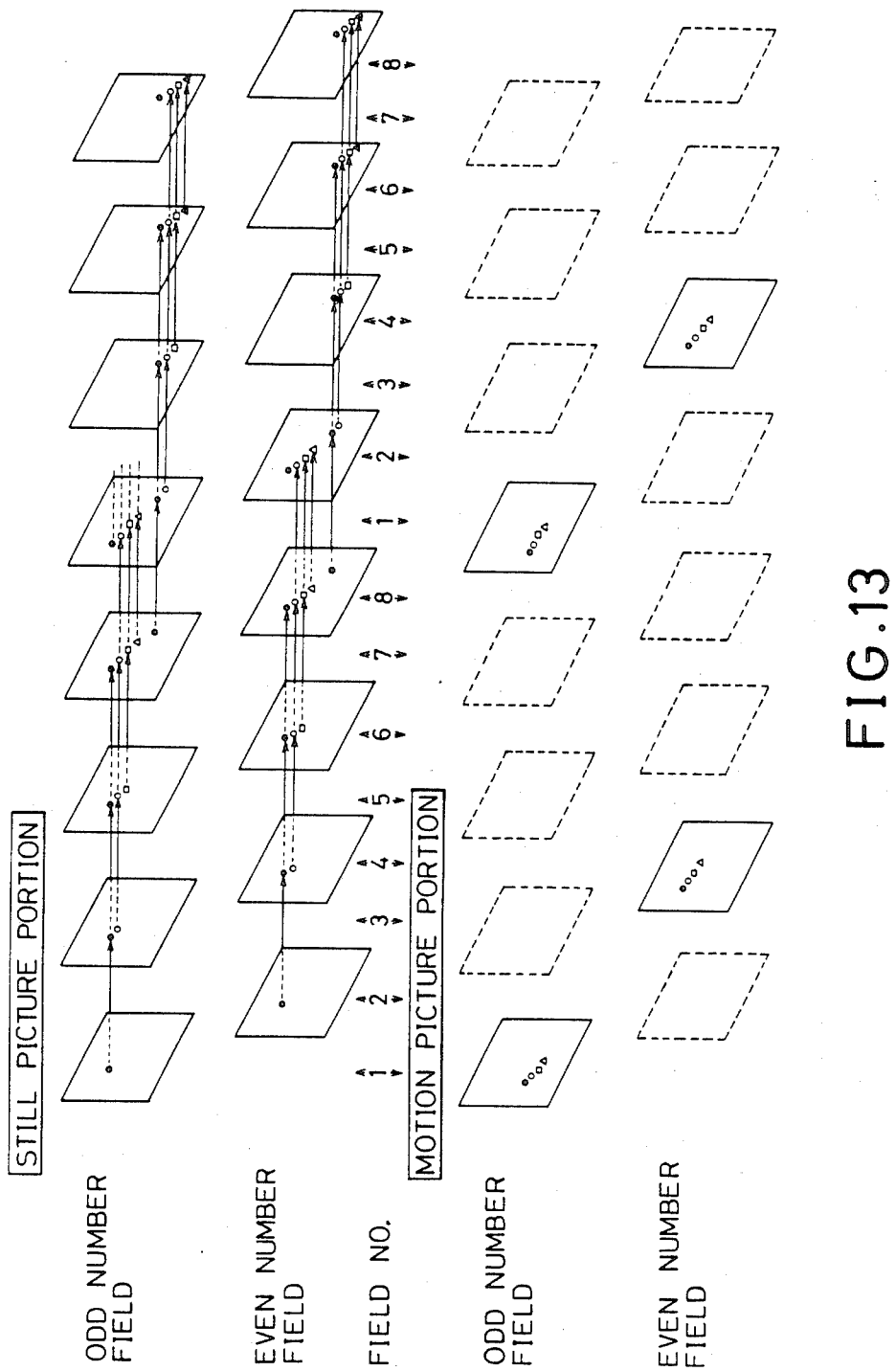
FIG. 13 is an explanatory diagram used to explain a second embodiment of the present invention.

FIG. 12 shows a detailed embodiment of the motion judgement circuit 60 and the interpolation circuit 62 for interpolating picture elements in a still picture region. In this embodiment, the motion judgement frame memory 58 is formed by a four-bit memory, and the difference signal frame memory 64 is formed by a six-bit memory for each of R, G and B. The following explanation will be made only in conjunction with the R channel hereinafter, but the G and B channels may be arranged in the same manner.

The luminance signal Y delivered from the encoder 56 is converted by an A/D converter 84 into a digital luminance signal consisting of four bits which in turn are stored frame by frame into the frame memory 58 (for instance, MN7400 manufactured by Matsushita). It is sufficient that the memory 58 stores motion data and therefore it is not necessary that the memory 58 has a high resolution, and hence it is sufficient that the memory 58 is a four-bit memory.

The luminance signal $Y_D$ from the frame memory 58 and the digital luminance signal from the A/D converter 84 are applied to a digital difference circuit 86 so as to obtain the difference in the luminance signal between the present frame and the preceding frame. The difference signal thus obtained is applied to a digital comparator 88 which compares the received difference signal with a predetermined threshold value Vth delivered from a threshold value generator 90. When the difference signal is greater than the predetermined threshold value Vth, it is judged that there exists a motion so that the interpolation control signal $R_{IC}=$"1" is outputted. On the other hand, when the difference signal is lower than the threshold value Vth, it is judged that the picture is still so that the signal $R_{IC}=$"0" is delivered.

The difference signal $R_\Delta$ from the time-axis expansion circuit 54 is applied to an A/D converter 92 and converted into a digital difference signal consisting of 6 bits. These 6 bits are applied to the six-bit frame memory 64 (for instance, MN7400×2) and to a six-bit digital switch 62 as the still picture region interpolation circuit 62. In response to the interpolation control signal $R_{IC}$ described above, the digital switch 62 is switched to the motion picture position M or to the still picture position S. When the switch 62 is switched to the motion picture position M, the difference signal of the present frame that is, the output from the converter 92 is derived as it is from the switch 62. When the switch 62 is switched to the still picture position S, the difference signal $R_{\Delta D}$ from the frame memory 64 is derived from the digital switch 62 to accomplish the interpolation. The difference signal derived from the digital switch 62 is applied to a D/A converter 94 (for instance, CX20051A manufactured by Sony) conversion into an analog signal which in turn is applied as the difference signal $R_{\Delta I}$ to the adder 66.

Next, the second embodiment of the present invention, which is different from the first embodiment described above, will be described in detail hereinafter.

In case of a picture moving in the depth direction, it is sufficient to transmit just one frame picture information every ½ second, even if a sufficient margin is taken into consideration. Therefore, the following is possible. That is, on the side of the encoder, the difference signal for a motion picture moving in the depth direction is stored every 8 fields (about 8 Hz) and for transmission of the picture signal, the difference signal is thinned out, as illustrated in FIGS. 4B and 4C, so as to reduce the frequency band. On the receiving side, picture elements of 8 fields are stored and, every 8 fields, the difference signal of the picture moving in the depth direction is reproduced. Then, the two-dimensional resolution of the picture moving in the depth direction can be increased, as will be described in detail.

Figure 14:
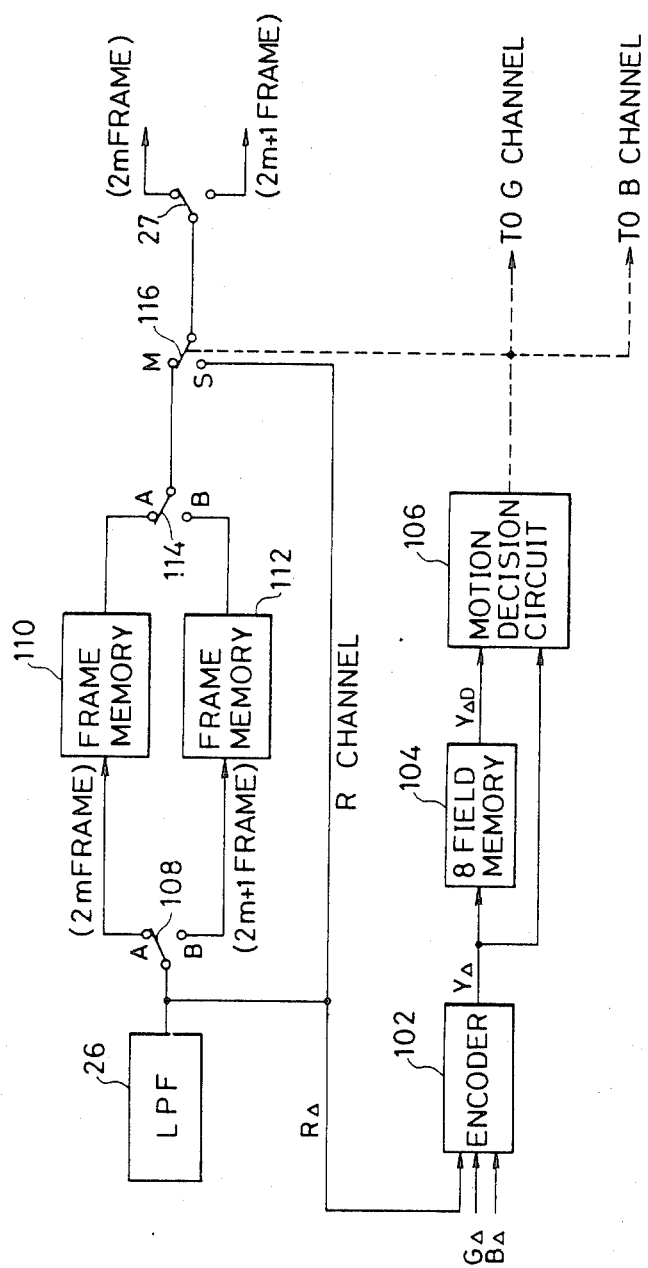
FIG. 14 is a block diagram showing a partial construction of the encoder used in the second embodiment.

FIG. 14 shows an embodiment of the encoder used in the second embodiment. In this embodiment, the circuit as shown in FIG. 14 is inserted between the low-pass filter 26 and the analog switch 27 shown in FIG. 2.

In FIG. 14, the difference signals $R_\Delta$, $G_\Delta$ and $B_\Delta$ derived from the respective low-pass filters 26 for the R, G and B channels are applied to an encoder 102, so that the difference signal $Y_\Delta$ of the luminance signal is obtained. The difference signal $Y_\Delta$ is applied to an eight-field memory 104 to obtain an output $Y_{\Delta D}$ delayed by eight fields. The signal $Y_{\Delta D}$ in turn is applied, together with the present difference signal $Y_\Delta$, to a judgement circuit 106, which is substantially similar to that shown in FIG. 12. Circuit 106 compares signals $Y_{\Delta D}$ and $Y_\Delta$, and motion is detected depending upon whether the difference output between the signals $Y_{\Delta D}$ and $Y_\Delta$ is higher or lower than a predetermined threshold value.

The difference signals $R_\Delta$, $G_\Delta$ and $B_\Delta$ derived from the respective low-pass filters 26 for the R, G and B channels (only the R channel will be described hereinafter) are applied to an analog switch 108 which switches every frame so that an even-number frame is stored in a frame memory 110, while an odd-number frame is stored in a frame memory 112. As a result, each of the frame memories 110 and 112 stores one frame. The outputs from the frame memories 110 and 112 are alternately derived through an analog switch 114 which is switched in synchronism with the switch 108.

The output from the switch 114 is applied to the switch 27 shown in FIG. 2 through an analog switch 116 which is actuated in response to the output signal from the motion judgement circuit 106. The M side contact of the switch 116 indicates a motion picture contact and the S side contact of the switch 116 indicates a still picture contact.

That is, when the switch 116 is on the contact S side, the output from the low-pass filter 26 is directly applied to the switch 27. On the other hand, in case of a motion picture, its motion information is judged every 8 fields and the output from the frame memory 110 or 112 is subjected to the sub-Nyquist sampling in the subsampling circuit 28 or 30.

As described above, in the second embodiment, motion information is subjected to the subsampling every 8 fields.

Figure 15:
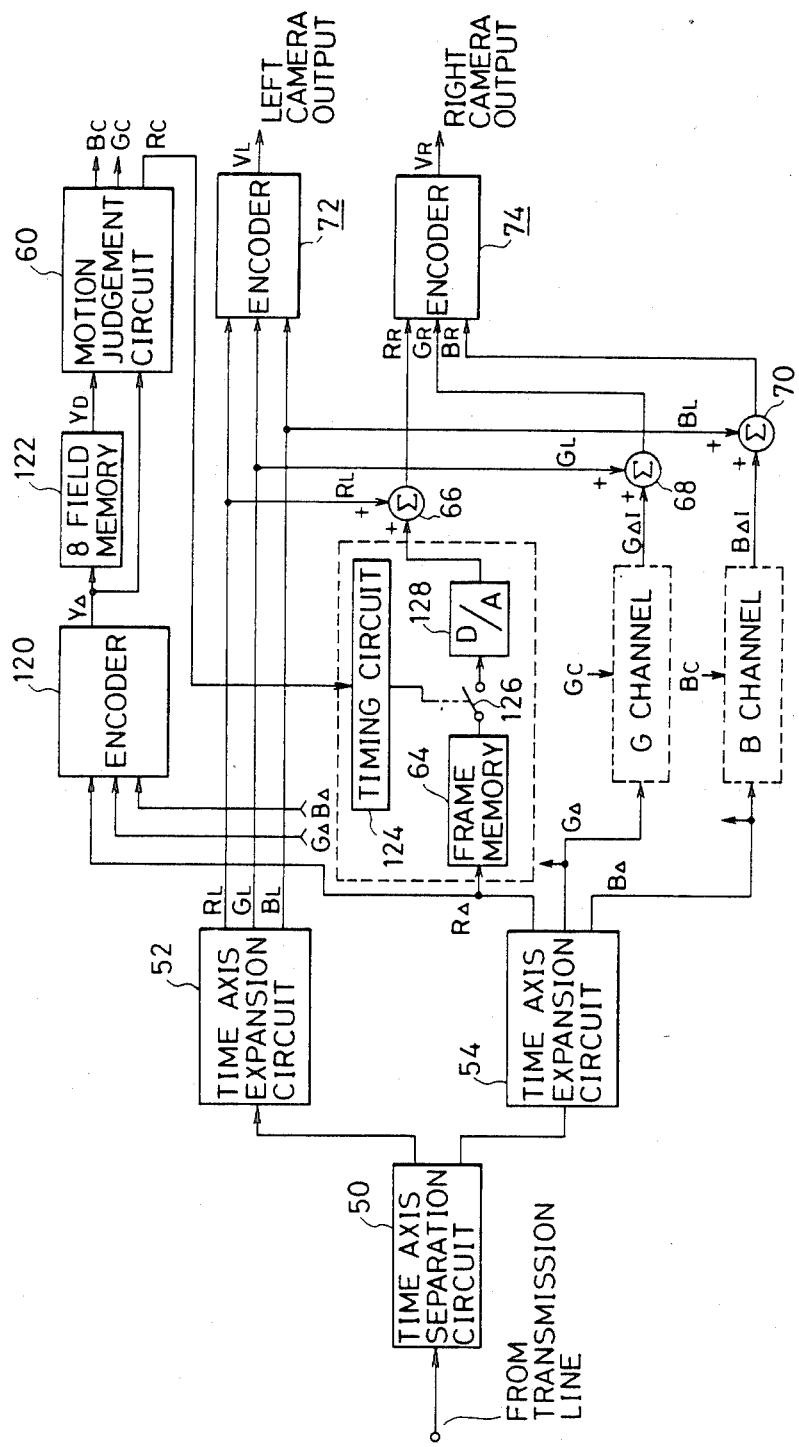
FIG. 15 is a block diagram showing the whole construction of the decoder used in the second embodiment.

The decoder used in the second embodiment may be arranged as shown in FIG. 15. The same reference numerals are used to designate similar parts in both FIGS. 7 and 15 and the explanation of the parts will be omitted.

In FIG. 15, an encoder 120 receives the difference signals $R_\Delta$, $G_\Delta$ and $B_\Delta$ from the time-axis expansion circuit 54 to form the difference signal $Y_\Delta$ of the luminance signal. The difference signal is then applied to an eight-field memory 122 to obtain a difference signal $Y_{\Delta D}$ delayed by eight fields, which in turn is applied to the motion judgment circuit 60. The motion judgement circuit 60 detects whether or not motion exists every 8 fields and delivers the judgement outputs Rc, Gc and Bc. In the second embodiment, an eight-field memory is used as the field memory 122, so that in order to reduce its storage capacity, the difference signals $R_\Delta$, $G_\Delta$ and $B_\Delta$ are stored.

Figure 16:
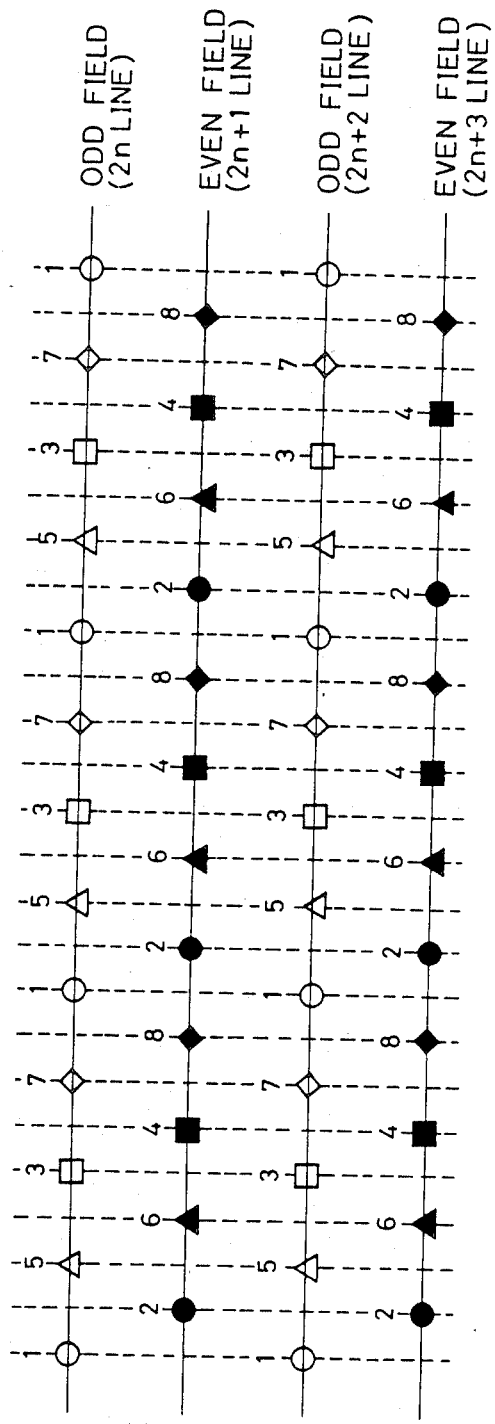
FIG. 16 is an explanatory diagram used to explain the sequence of writing into the frame memory.

The difference signals $R_\Delta$, $G_\Delta$ and $B_\Delta$ derived from the time-axis expansion circuit 54 are applied to the respective frame memories 64 for respective channels. The frame memory 64 has a storage capacity sufficient to store all picture elements of one frame which is sub-Nyquist-sampled. Irrespective of a still picture portion or a motion picture portion, the frame memory 64 stores therein the whole picture elements in the order of sampling; that is, in the order of the field numbers as shown in FIG. 16, for instance.

Figure 17:
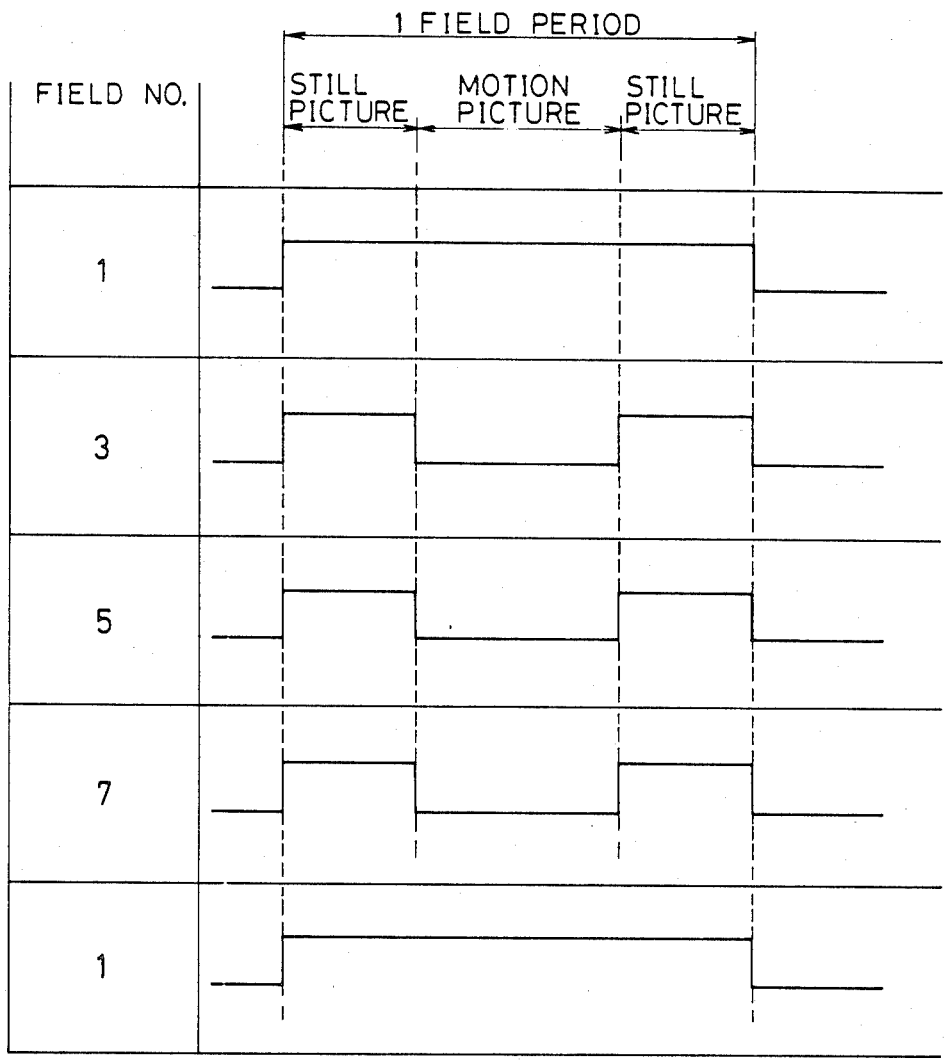
FIG. 17 is a timing chart used to explain the mode of operation of the timing circuit shown in FIG. 15.

On the other hand, the judgement output Rc derived from the motion judgement circuit 60 is applied to a timing circuit 124, and in case of a still picture, timing pulses which are turned on and off every field are produced, while in case of a motion picture, timing pulses which are displaced from each other by four fields in each of the odd numbered and even numbered fields and which are spaced apart from each other by 8 fields are produced, as illustrated in FIG. 17.

The timing pulses delivered from the timing circuit 124 are applied to a digital switch 126, so that the difference signal stored in the frame memory 64 is derived in accordance with the timing pulses, as illustrated in FIG. 17, depending upon the motion of the picture. The output from the switch 126 is applied to a D/A converter 128 and is converted into an analog output, which in turn is applied to the adders 66, 68 and 70. In the second embodiment, the interpolation of picture elements is processed both for the motion and still pictures and in case of a still picture portion, the interpolated difference signal $R_\Delta$ is derived as it is. In the case of a motion picture portion, however, no difference signal $R_\Delta$ is derived during the time interval of 8 fields where the interpolation is carried out, but the difference signal $R_\Delta$ is derived at the timing of every 8 fields when the interpolation is completed.

When a motion in the depth direction exceeds a predetermined threshold value so that the resolution in motion is degraded, intrafield interpolation may be additionally used, thereby improving a quality of picture.

Figure 18:
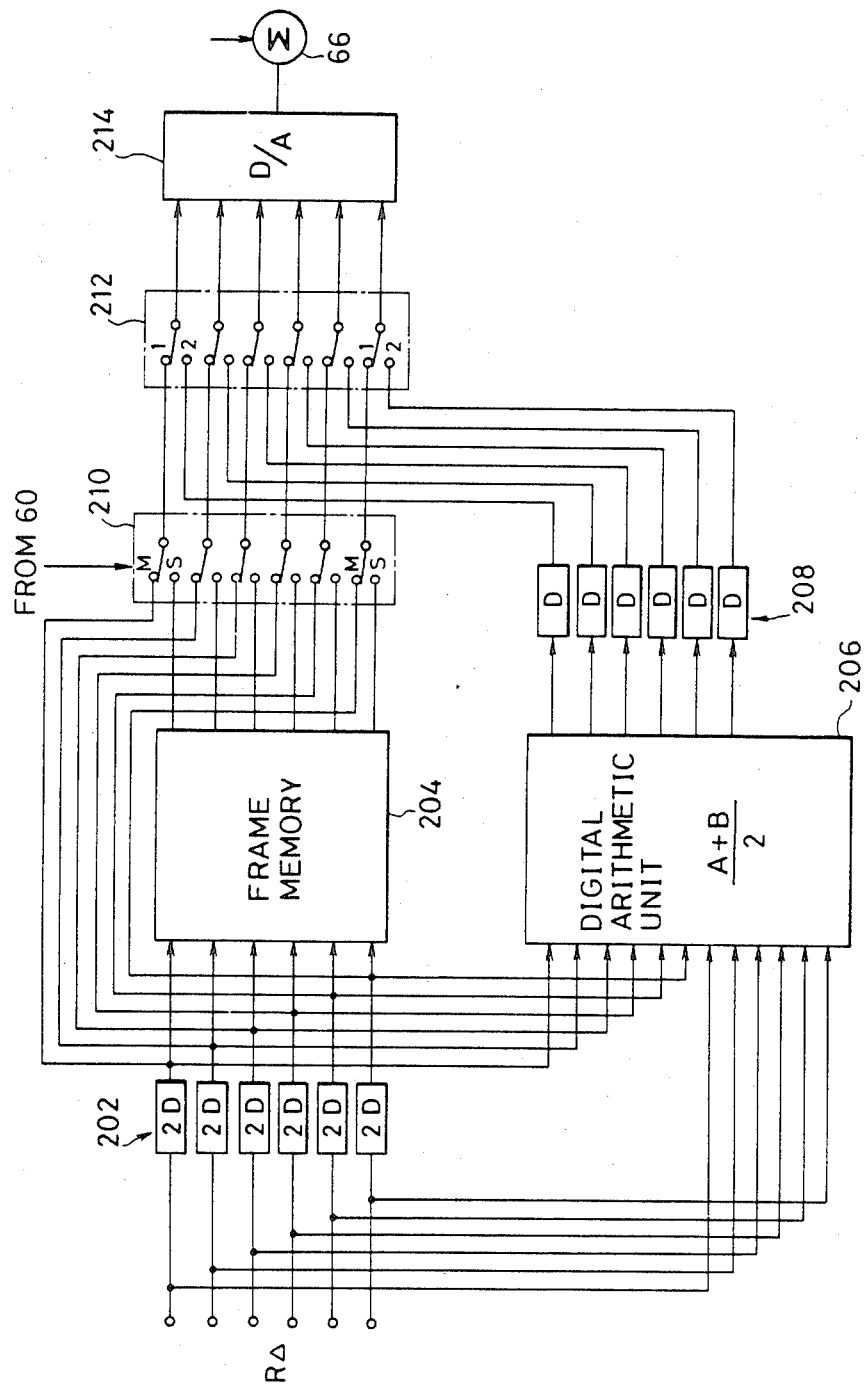
FIG. 18 is a block diagram showing an embodiment for performing the interpolation of a moving picture in a field in accordance with the present invention.

FIG. 18 shows an embodiment for intrafield interpolation.

Figure 19:
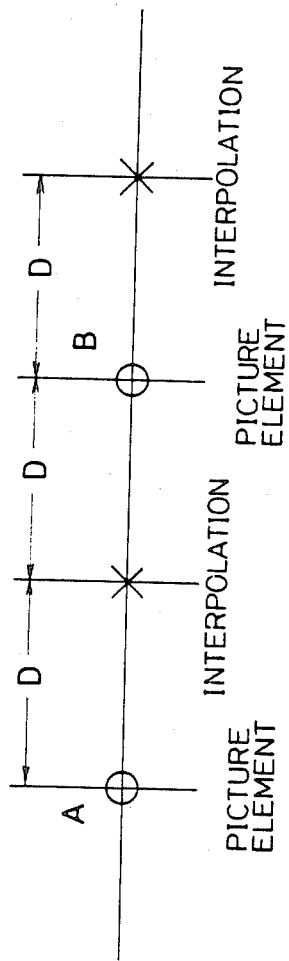
FIG. 19 is an explanatory diagram used to explain the mode of interpolation thereof.
Figure 20:
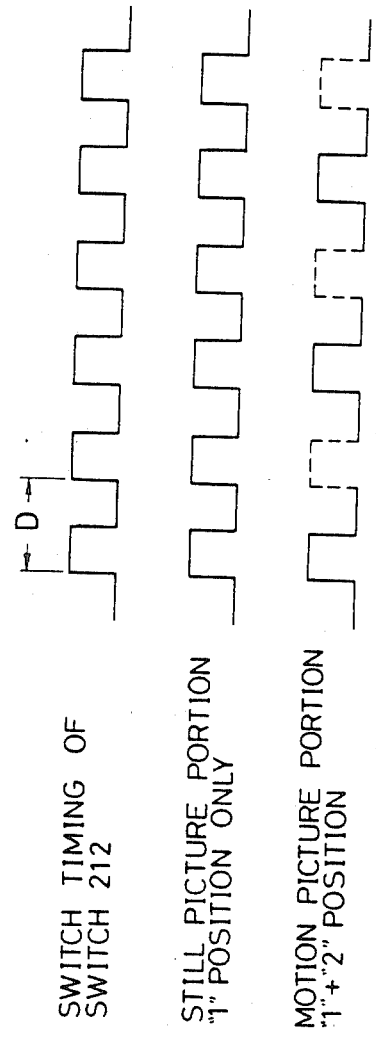
FIG. 20 is a timing chart illustrating the interpolation timing.

The difference signal $R_\Delta$ of each channel derived from the time-axis expansion circuit 54 shown in FIG. 7 is applied to a frame memory 204 through a time-delay circuit 202, which delays the difference signal $R_\Delta$ by a time interval 2D between picture elements A and B in case of sub-Nyquist sampling as shown in FIG. 19. The difference signal $R_\Delta$ and the output from the time-delay circuit 202 are applied to a digital arithmetic unit 206 to obtain an average of the difference signal $R_\Delta$ and the output from the time-delay circuit thereby producing an output $(A+B)/2$ with respect to the adjacent picture elements A and B. The average output is applied through a time-delay circuit 208, with a time delay of D, to contacts "2" of a digital switch 212. The outputs from the time-delay circuit 202 and the frame memory 204 are applied to the motion picture contacts M and the still picture contacts S of a digital switch 210, respectively. Switch 210 is controlled by the output from the motion judgement circuit 60, and the output from the digital switch 210 is applied to the contacts "1" of the digital switch 212. The digital switch 212 is switched at the timing of a period D, so that, as shown in FIG. 20, in case of a still picture portion, the difference signal for which interpolation is processed at a position delayed by a time interval D through the frame memory 204 is derived from the "1" position. On the other hand, in case of a motion picture portion, the difference signal is derived from the time delay circuit 202 when the digital switch 212 is at the position of the contacts "1", but when the digital switch 212 is at the position of the contacts "2", the difference signal which is delayed by a time interval D and is interpolated is derived from the time-delay circuit 208. The difference signal which is intrafield interpolated in case of a motion picture is converted into an analog difference signal by a D/A converter 214 and is applied to the adder 66 (68, 70).

In the first and second embodiments described above, a sufficient margin is taken into consideration. However, in order to further compress the frequency band for practical purpose, in case of the first embodiment, a system in which subsampling is carried out every 12-16 fields may be employed and in case of the second embodiment, a system in which motion parallax is reproduced at an interval more than 10 fields may be employed. In these cases, for a motion picture moving in the depth direction, the interpolation is carried out between the picture elements in the first embodiment, while in the second embodiment, the interpolation is carried out between the fields to be reproduced, so that motion compensation is performed and consequently a picture moving in the depth direction can be smoothly reproduced.

According to the present invention, when a stereoscopic television signal is transmitted or recorded while the frequency band of the television signal is compressed, subsampling in which visual perception characteristics are taken into consideration is carried out so that a more highly defined three-dimensional picture can be displayed.

That is, in a picture transmission system in accordance with the present invention, the transmission of a difference signal of components in the depth direction is contemplated so that when there exists no parallax, the difference signal becomes zero. As a result, the same left and right pictures are reproduced, so that they are substantially similar to a conventional television picture.

In case of a still picture in the depth direction, the interpolation of the subsampled signals is effected in each field so that an extremely finely defined three-dimensional picture can be reproduced. On the other hand, in case of a picture moving in the depth direction, the sampling number can be reduced based on visual characteristics, so that a natural picture can be reproduced, while the frequency band to be occupied by the television siganl can be reduced. Especially in case of a motion picture which is moving so fast that the visual perception of its depth by both eyes is impossible, the parallax signal becomes zero. In this case, the same right and left pictures are displayed, so that the picture quality is not degraded. Therefore, a viewer has a depth perception not by convergence of both eyes in a binocularly manner, but by a motion which can be visually percepted in a monoculary manner and thus the transition between the binoculary and monoculary viewings is made smoothly.

In addition, frame memories which are required in the receiver are used only for producing difference signals and for detecting a motion, so that it is sufficient that their storage capacity is low and consequently costs for the memories can be reduced, so that a stereoscopic television picture transmission system in accordance with the present invention can be realized inexpensively.

In accordance with the present invention, a stereoscopic picture signal can be recorded by a VTR, so that the present invention is equally applicable to CATV, various video softwares and so on.

The sub-Nyquist sampling technique used in the present invention may also be used in a high definition television system (such as a MUSE system; that is, Multiple Sub-Nyquist Sampling Encoding System), so that as the MUSE system becomes widely used, a high definition stereoscopic television system can be realized merely by adding simple circuit modifications to the MUSE system.

What we claim is:

1. A stereoscopic television picture transmission system, characterized by comprising:
    means for obtaining a picture signal with respect to one of right and left pictures in stereoscopic television;
    means for obtaining a difference signal between a right picture signal for the right picture and a left picture signal for the left picture;
    means for effecting sub-Nyquist sampling of said difference signal at a frame period relating to a critical frequency for stereoscopic visual perception in a direction of depth to obtain a sampled difference signal;
    means for combining said one picture signal with said sampled difference signal to form a combined signal and for transmitting said combined signal;
    means for separating said one picture signal and said difference signal from the combined signal thus transmitted;
    means for judging a motion between frames of said one picture signal thus separated;
    means responsive to a result of judgement of a motion by said judging means for effecting interframe interpolation of a difference signal thus separated; and
    means for combining said separated one picture signal with said interframe interpolated difference signal, to obtain the other picture signal of said right and left picture signals.

2. A stereoscopic television picture transmission system as claimed in claim 1, characterized in that in case of a still picture which does not move in the depth direction, picture elements of at least a picture longer than one frame are interpolated sequentially by a difference signal between adjacent frames of a plurality of successive frames.

3. A stereoscopic television picture transmission system as claimed in claim 1, characterized in that when said separated one picture signal has a motion in excess of a predetermined threshold value in the depth direction of the picture, at least said separated difference signal is subject to intrafield interpolation.

4. A stereoscopic television picture transmission system as claimed in claim 1, characterized in that when said frame period is longer than a predetermined value, said separated difference signal is subjected to intrafield interpolation.

5. A stereoscopic television picture transmission system as claimed in any one of claim 1, characterized in that both of said difference signal and said one picture signal are time-axis compressed and time-axis multiplexed to be transmitted.

6. A stereoscopic television picture transmission apparatus, characterized by comprising:
    means for deriving a picture signal of one of right and left pictures in stereoscopic television;
    means for limiting a frequency band of said one picture signal;
    means for effecting time-axis compression of one picture signal whose frequency band is limited;
    means for obtaining a difference signal between a right picture signal for the right picture and a left picture signal for the left picture;
    means for limiting a frequency band of said difference signal;
    means for effecting sub-Nyquist sampling of said difference signal having a limited frequency band at a frame period relating to a critical frequency for stereoscopic visual perception in a direction of depth to obtain a sampled difference signal;
    means for effecting time-axis compression of said sampled difference signal; and
    means for combining said one picture signal thus time-axis compressed with the difference signal thus time-axis compressed.

7. In a stereoscopic television picture transmission system in which a picture signal with respect to one of right and left pictures in stereoscopic television is derived, a difference signal between a right picture signal for the right picture and a left picture signal for the left picture is obtained and is subject to sub-Nyquist sampling at a frame period relating to a critical frequency for the visual perception in a direction of depth to obtain a sampled difference signal, and said one picture signal and said sampled difference signal are time-axis compressed and combined to be transmitted; a stereoscopic television picture receiving apparatus, characterized by comprising:
    means for separating said one picture signal and the difference signal from the combined signal thus transmitted;
    means for effecting time-axis expansion of said one picture signal thus separated;
    means for effecting time-axis expansion of the difference signal thus separated;
    means for judging a motion between frames of said one picture signal thus time-axis expanded;
    means responsive to a result of judgement of a motion by said judging means for effecting interframe interpolation of said difference signal thus time-axis expanded; and
    means for combining said time-axis expanded one picture signal with said interframe interpolated difference signal to obtain the other picture signal of the right and left picture.

8. A stereoscopic television picture receiving apparatus as claimed in claim 7, characterized in that in case of a still picture which does not move in the depth direction, picture elements at least of a picture longer than one frame are sequentially interpolated by a difference signal between adjacent frames of a plurality of succeeding frames.

9. A stereoscopic television picture receiving apparatus as claimed in claim 7, characterized in that when said separated one picture signal has a motion in excess of a predetermined threshold value in the depth direction of the picture, at least said separated difference signal is subject to the intrafield interpolation.

10. A stereoscopic television picture receiving apparatus as claimed in claim 7, characterized in that when said frame period is longer than a predetermined value, said separated difference signal is subject to intrafield interpolation.

11. A stereoscopic television picture transmission system, characterized by comprising:
 means for obtaining a picture signal with respect to one of right and left pictures in stereoscopic television;
 means for obtaining a difference signal between a right picture signal for the right picture and a left picture signal for the left picture;
 means for dividing and assigning said difference signal into the number of frames corresponding to a frame period relating to a critical frequency for stereoscopic visual perception in a direction of depth to obtain a divided difference signal;
 means for effecting sub-Nyquist sampling of said divided difference signals at said frame period;
 means for combining said one picture signal with said sampled difference signal to form a combined signal and for transmitting said combined signal;
 means for separating said one picture signal and the difference signal from the combined signal thus transmitted;
 means for effecting interframe interpolation of the difference signal thus separated at said frame period; and
 means for combining said separated one picture signal with said interpolated difference signal to obtain the other picture signal of said right and left picture signals.

12. A stereoscopic television picture transmission system as claimed in claim 11, characterized in that when said frame period is longer than a predetermined value, the interframe interpolation of said separated difference signal is carried out.

13. A stereoscopic television picture transmission system as claimed in claim 12, characterized in that a motion in a predetermined number of fields in said separated difference signal is judged in such a way that when a motion judgement result indicates a still picture, said separated difference picture is derived as it is, and when the motion judgement result indicates a motion picture, said separated difference signal is derived every time of said predetermined number of fields.

14. A stereoscopic television picture transmission system as claimed in claim 2, characterized in that both of said difference signal and said one picture signal are time-axis compressed and time-axis multiplexed to be transmitted.

15. A stereoscopic television picture transmission system as claimed in claim 3, characterized in that both of said difference signal and said one picture signal are time-axis compressed and time-axis multiplexed to be transmitted.

16. A stereoscopic television picture transmission system as claimed in claim 4, characterized in that both of said difference signal and said one picture signal are time-axis compressed and time-axis multiplexed to be transmitted.

* * * * *